US008542653B1

(12) United States Patent
Dinan et al.

(10) Patent No.: US 8,542,653 B1
(45) Date of Patent: *Sep. 24, 2013

(54) MOBILE COMMUNICATION DEVICE INITIATED HAND-OFF BASED ON WIRELESS BASE STATION PRIORITY

(75) Inventors: Esmail Hejazi Dinan, Herndon, VA (US); Jong-hak Jung, Herndon, VA (US); Swati Tiwari, Fairfax, VA (US); Hemanth Balaji Pawar, Herndon, VA (US); Krishna D. Sitaram, Chantilly, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/350,242

(22) Filed: Jan. 13, 2012

Related U.S. Application Data

(63) Continuation of application No. 12/181,924, filed on Jul. 29, 2008, now Pat. No. 8,121,090.

(51) Int. Cl.
*H04W 36/04* (2009.01)
(52) U.S. Cl.
USPC .......................... 370/331; 455/437; 455/444
(58) Field of Classification Search
None
See application file for complete search history.

(56) References Cited

U.S. PATENT DOCUMENTS

| 6,430,168 | B1 | 8/2002 | Djurkovic et al. |
| 6,597,911 | B1 | 7/2003 | Kransmo |
| 6,748,213 | B1 | 6/2004 | Kim |
| 7,082,305 | B2 | 7/2006 | Willars et al. |
| 7,590,422 | B1 | 9/2009 | Chow et al. |
| 7,623,866 | B1 | 11/2009 | Sptzer |
| 2002/0068581 | A1 | 6/2002 | Salonaho |
| 2007/0026861 | A1 | 2/2007 | Kuhn et al. |
| 2007/0072614 | A1 | 3/2007 | Forsberg |
| 2007/0091849 | A1 | 4/2007 | Park et al. |
| 2007/0097938 | A1 | 5/2007 | Nylander et al. |
| 2007/0177510 | A1 | 8/2007 | Natarajan et al. |
| 2009/0196253 | A1* | 8/2009 | Semper .................. 370/331 |

* cited by examiner

*Primary Examiner* — Min Jung
(74) *Attorney, Agent, or Firm* — O'Brien Jones, PLLC (57) ABSTRACT

A mobile communication device wirelessly transfers user communications to a first wireless base station. The mobile communication device identifies a second wireless base station that has sufficient performance characteristics for wireless communication with the mobile communication device and that has a higher communication priority than the first wireless base station. In response, the mobile communication device initiates a hand-off from the first wireless base station to the second wireless base station. In response to the hand-off, the mobile communication device stops the wireless transfer of the user communications to the first wireless base station and wirelessly transfers additional user communications to the second wireless base station.

12 Claims, 6 Drawing Sheets

| PRIORITIZED BASE STATION LIST 600 | | |
|---|---|---|
| BASE STATION GROUP A – PRIORITY 1<br>BASE STATION 531<br>BASE STATION 532<br>BASE STATION 533<br>BASE STATION 534 | BASE STATION GROUP B – PRIORITY 2<br>BASE STATION 521<br>BASE STATION 522<br>BASE STATION 523 | BASE STATION GROUP C – PRIORITY 3<br>BASE STATION 510 |

MOBILE COMMUNICATION DEVICE INITIATED HAND-OFF BASED ON WIRELESS BASE STATION PRIORITY

This application is a continuation of prior application Ser. No. 12/181,924; currently in condition for allowance, filed Jul. 29, 2008, which is hereby incorporated by reference.

TECHNICAL BACKGROUND

A mobile communication device and its serving base station wirelessly communicate to provide voice, Internet, email, text, video, and other communication services. As the mobile communication device moves about, the serving base station hands-off the mobile communication device to another target base station. After the hand-off, the target base station then becomes the serving base station, and subsequently, this new serving base station will hand-off the mobile communication device to another target base station.

In some communication systems, the mobile communication device receives a list of nearby base stations from the serving base station. If the mobile communication device detects an unacceptable loss of wireless signal strength for the serving base station, then the mobile communication device selects another base station from the list having the best wireless signal strength to be the target base station. The mobile communication device then initiates a hand-off from the serving base station to the selected target base station.

Serving base stations may also initiate hand-offs when they become overloaded and need to reduce the number of mobile communications devices they serve. Typically, the overloaded base station hands-off the mobile communication devices to more lightly loaded base stations. Serving base stations may also initiate hand-offs based on low wireless signal strength.

Some communication networks have a hierarchical design where cells overlap or are nested within one another. A very large cell may contain a number of mid-sized cells, and the mid-sized cells may contain a number of very small cells. There are gaps between the very small cells that are served by the mid-sized cells or by the larger cells. There are gaps between the mid-sized cells that are served by the larger cells. The use of base station lists and signal-strength by mobile communication devices to select target base stations tends to overload the larger cells. The use of load balancing by the larger cells tends to increase network signaling and processing to unacceptable levels.

Overview

A mobile communication device wirelessly transfers user communications to a first wireless base station. The mobile communication device identifies a second wireless base station that has sufficient performance characteristics for wireless communication with the mobile communication device and that has a higher communication priority than the first wireless base station. In response, the mobile communication device initiates a hand-off from the first wireless base station to the second wireless base station. In response to the hand-off, the mobile communication device stops the wireless transfer of the user communications to the first wireless base station and wirelessly transfers additional user communications to the second wireless base station.

DETAILED DESCRIPTION

Figure 1:
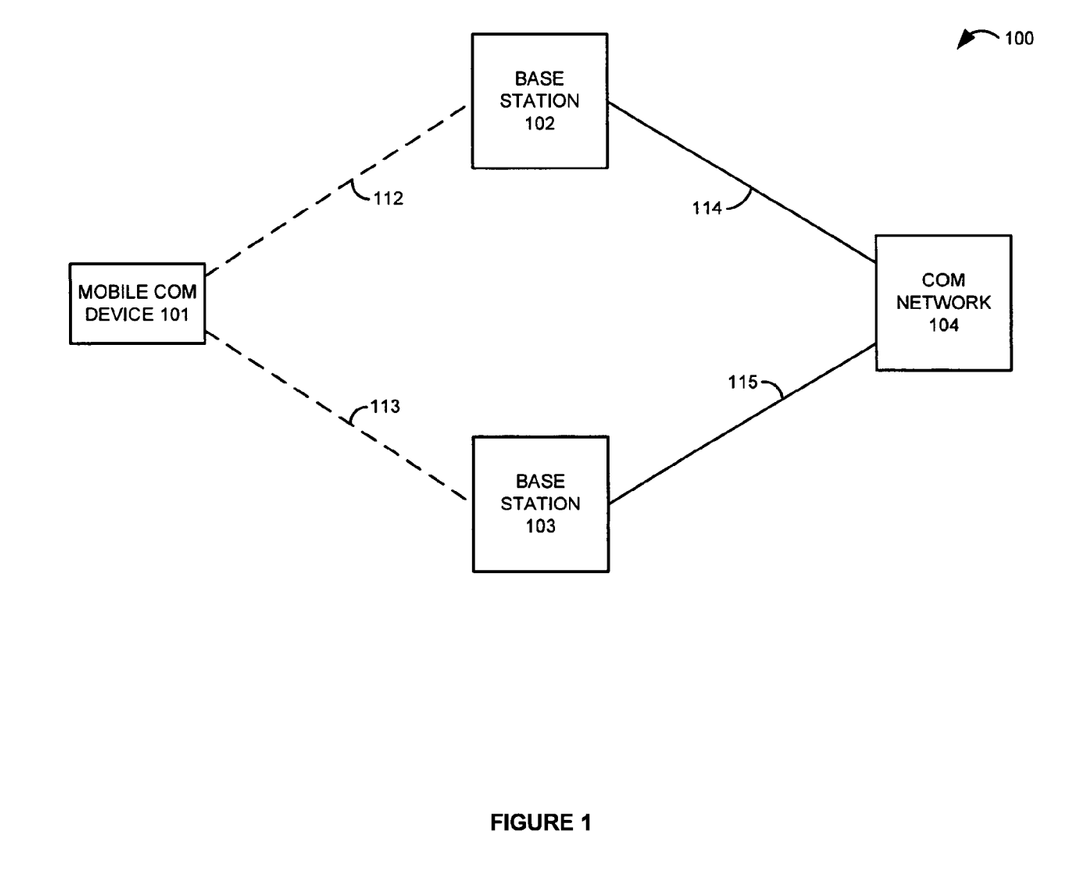
FIG. 1 is a block diagram that illustrates a communication system.

FIG. 1 is a block diagram that illustrates communication system 100. Communication system 100 comprises mobile communication device 101, wireless base stations 102-103, and communication network 104. Mobile communication device 101 and base station 102 communicate over wireless communication link 112. Mobile communication device 101 and base station 103 communicate over wireless communication link 113. Base station 102 and communication network 104 communicate over communication link 114. Base station 103 and communication network 104 communicate over communication link 115.

Mobile communication device 101 comprises a telephone, transceiver, computer, digital assistant, Internet access device, or some other wireless communication apparatus—including combinations thereof. Base stations 102-103 comprise antennas, transceivers, amplifiers, filters, routers, servers or some other communication components—including combinations thereof. Communication network 104 comprises wireless communication nodes, telephony switches, internet routers, network gateways, computer systems, communication links, or some other type of communication equipment—including combinations thereof.

Wireless communication links 112-113 use the air or space as the transport media. Wireless communication links 112-113 may use various protocols, such as wireless fidelity, code division multiple access, global system for mobile communications, worldwide interoperability for microwave access, long term evolution, internet, telephony, or some other communication format—including combinations thereof. Communication links 114-115 use metal, glass, air, or some other material as the transport media. Communication links 114-115 could use various protocols, such as wireless fidelity, code division multiple access, global system for mobile communications worldwide interoperability for microwave access, internet, Ethernet, telephony, time division multiplex, or some other communication format—including combinations thereof. Communication links 114-115 may be direct links or may include various intermediate communication nodes, systems, or networks.

Figure 2:
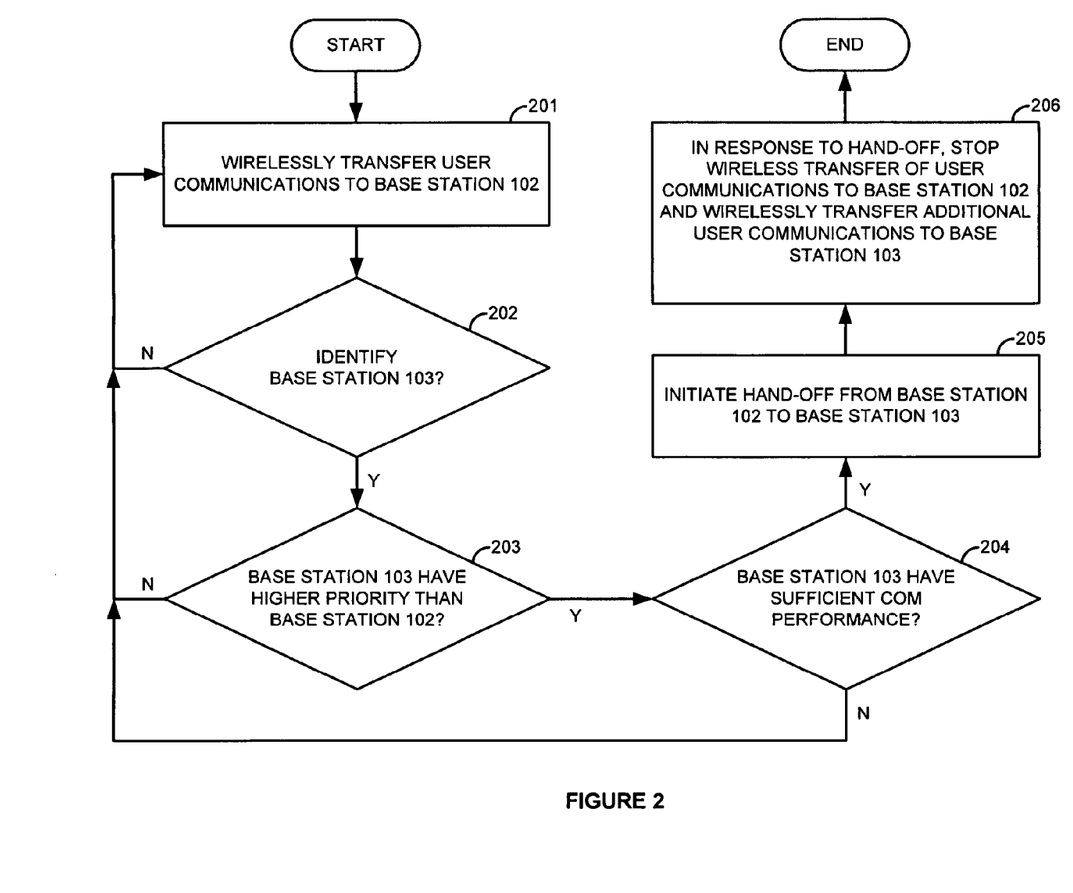
FIG. 2 is a flow diagram that illustrates the operation of the communication system.

FIG. 2 is a flow diagram that illustrates the operation of mobile communication device 101 within communication system 100. The operation starts with mobile communication device 101 wirelessly transferring user communications to base station 102 over wireless communication link 112 (201). User communications include voice, video, audio, Internet, or some other type of user information—including combinations thereof. User communications do not include the control information that is exchanged between mobile communication device 101 and communication system 100 to establish the communication paths that transfer the user communications. At this point, mobile communication device 101 does not transfer user communications to base station 103, although some control information may be exchanged between mobile communication device 101 and base station 103.

If mobile communication device 101 identifies base station 103 (202), then device 101 determines if base station 103 has a higher communication priority than base station 102 (203). If mobile communication device 101 determines that base station 103 has a higher communication priority than base station 102 (203), then mobile communication device 101 determines if base station 103 has sufficient performance characteristics for wireless communication with mobile communication device 101 (204). If mobile communication device 101 determines that base station 103 has sufficient performance characteristics for wireless communication with mobile communication device 101 (204), then mobile communication device 101 initiates a hand-off from base station 102 to base station 103 (205). In response to the hand-off, mobile communication device 101 stops the wireless transfer of the user communications to base station 102 and wirelessly transfers additional user communications to base station 103 (206).

In the above operation, mobile communication device 101 can use various techniques to identify base station 103. Mobile communication device 101 may receive a base station list from base station 102 that identifies base station 103. Mobile communication device 101 may scan a predetermined set of frequencies to detect a pilot signal from base station 103. Mobile communication device 101 may access a database (internal or external) that translates the current location of device 101 into a base station list that identifies base station 103. Other suitable techniques could be used.

In the above operation, mobile communication device 101 can use various techniques to determine the communication priority of base stations 102-103. Mobile communication device 101 may obtain a base station list that is arranged in a prioritized order that indicates the relative priority of base stations 102-103. Such an arrangement might assign different priorities to different groups of base stations. Mobile communication device 101 may process a base station identifier, where identifier encodes the priority of that base station. An example of a base station identifier is a preamble code, although other identifiers could be used. Mobile communication device 101 may access a database (internal or external) that translates a base station identifier into a priority level for that base station. Other suitable techniques could be used.

In the above operation, mobile communication device 101 can use various techniques to determine sufficient communication performance for base station 103. Mobile communication device 101 may receive a noise indicator and/or a signal strength indicator for link 113 from base station 103. One example of a noise indicator is a signal to noise ratio. Mobile communication device 101 may perform signal processing to generate a noise indicator and/or a signal strength indicator for link 113. Mobile communication device 101 would then compare the noise indicator and/or the signal strength indicator to threshold values that represent sufficient communication performance. The threshold values could be pre-determined, and may be optimized based on the noise and signal strength indicators of serving base station 102. Mobile communication device 101 may access a database (internal or external) that translates the current location of device 101 into a determination of sufficient communication performance for base station 103. Other suitable techniques could be used.

In the above operation, mobile communication device 101 can use various techniques to initiate the handoff from base station 102 to base station 103. Mobile communication device 101 could transfer a hand-off request to base station 102. Mobile communication device 101 could transfer a hand-off request to base station 103. Mobile communication device 101 could transfer associated hand-off requests to both base stations 102-103. Mobile communication device 101 could transfer a hand-off request to some other control system. Typically a hand-off timer is used to delay the hand-off for a short period to ensure that the conditions initiating the hand-off are stable and not merely transitory. Other suitable techniques could be used.

Figure 3:
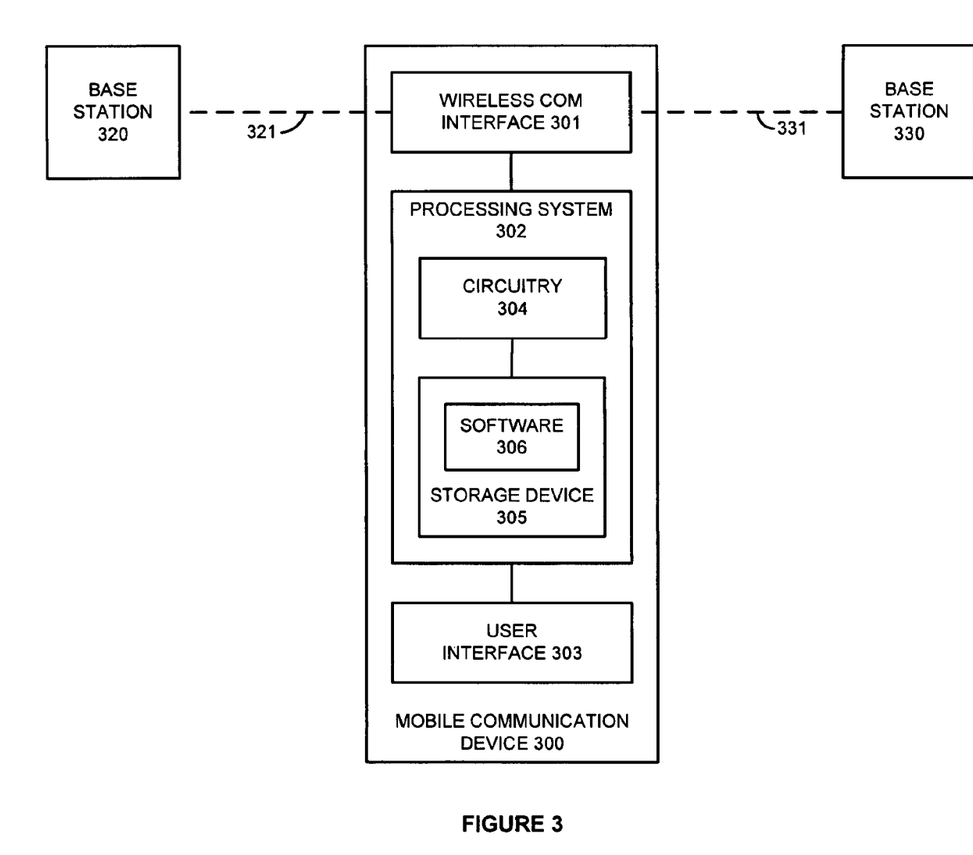
FIG. 3 is a block diagram that illustrates a mobile communication device.

FIG. 3 is a block diagram that illustrates mobile communication device 300. Mobile communication device 300 provides on example of communication device 101, although device 101 may use other configurations. Mobile communication device 300 may include other components (such as a battery or a camera) that are not shown for clarity. Mobile communication device 300 comprises wireless communication interface 301, processing system 302, and user interface 303. Processing system 302 is linked to wireless communication interface 301 and user interface 303. Processing system 302 includes circuitry 304 and storage device 305 that stores operating software 306.

Wireless communication interface 301 comprises components that transmit and receive wireless signals under the control of processing system 302. These components include an RF transceiver and antenna along with signal processing circuitry. The signal processing circuitry processes received wireless signals to generate noise indicators and/or signal strength indicators for the wireless signals. Although mobile communication device 300 may communicate with various base stations, wireless communication interface 301 is shown in communication with base station 320 over wireless link 321 and with base station 330 over wireless link 331.

Circuitry 304 comprises microprocessor and associated circuitry that retrieves and executes operating software 306 from storage device 305 to control wireless communication interface 301 and user interface 303. Storage device 305 comprises a disk drive, flash drive, memory circuitry, or some other memory device. Operating software 306 comprises computer programs, firmware, or some other form of machine-readable processing instructions. Operating software 306 may include an operating system, utilities, drivers, network interfaces, applications, or some other type of software. When executed by circuitry 304, operating software 306 directs processing system 302 to operate wireless communication device 300 as described herein.

User interface 303 comprises components that interact with the user under the control of processing system 302. These components may include a speaker, microphone, buttons, lights, display screen, touch screen, touch pad, scroll wheel, or some other user input/output apparatus.

Figure 4:
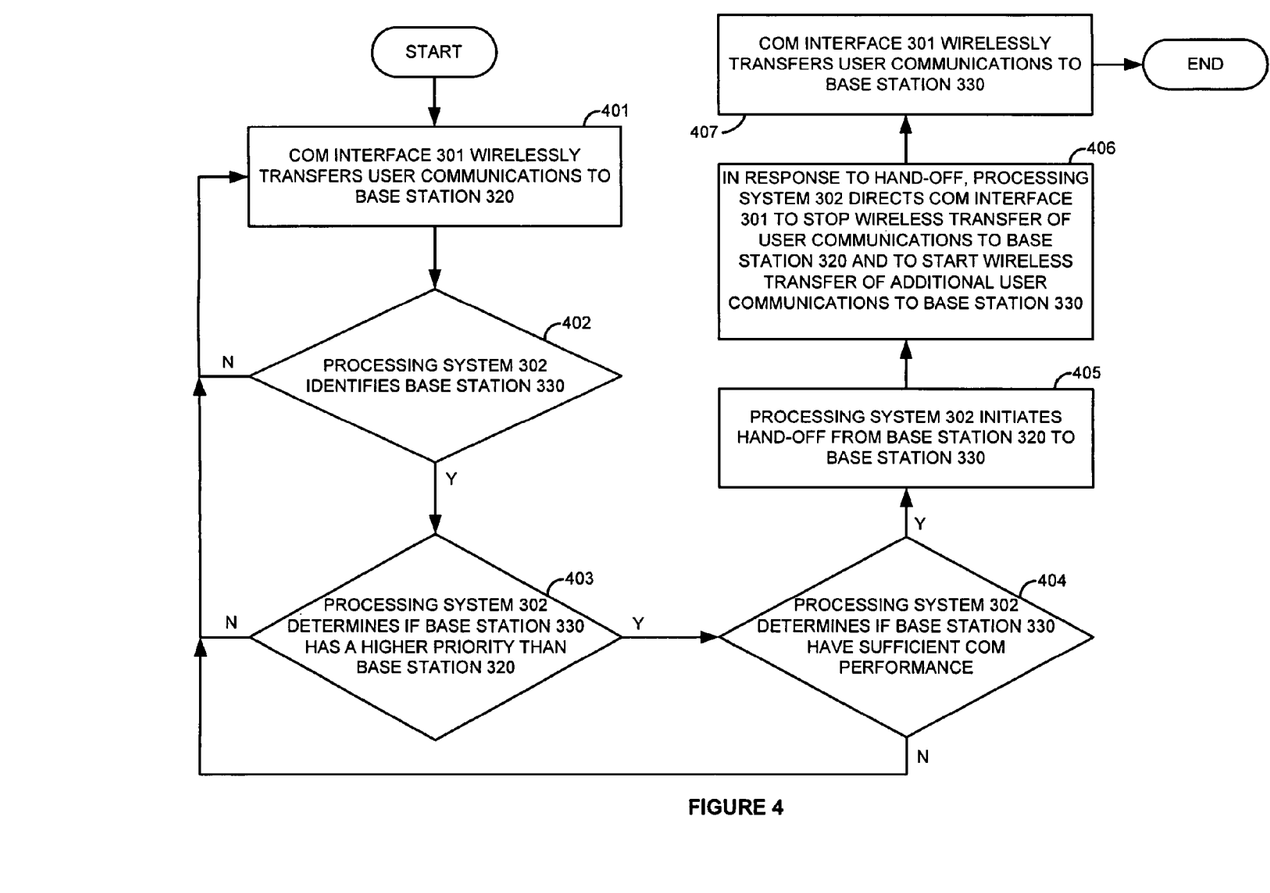
FIG. 4 is a flow diagram that illustrates the operation of the mobile communication device.

FIG. 4 is a flow diagram that illustrates the operation of mobile communication device 300. The operation starts with wireless communication interface 301 wirelessly transferring user communications to base station 320 over wireless communication link 321 (401). User communications include voice, video, audio, Internet, or some other type of user information—including combinations thereof. User communications do not include the control information that establishes the communication paths that transfer the user communications. At this point, mobile communication device 300 does not transfer user communications to base station 330, although some control information may be exchanged between mobile communication device 300 and base station 330.

If processing system 302 identifies base station 330 (402), then processing system 302 determines if base station 330 has a higher communication priority than base station 320 (403).

If processing system 302 determines that base station 330 has a higher communication priority than base station 320 (403), then processing system 302 determines if base station 330 has sufficient performance characteristics for wireless communication with mobile communication device 300 (404). If processing system 302 determines that base station 330 has sufficient performance characteristics for wireless communication with mobile communication device 300 (404), then processing system 302 initiates a hand-off from base station 320 to base station 330 (405). In response to the hand-off, processing system 302 directs wireless communication interface 301 to stop the wireless transfer of the user communications to wireless base station 320 over link 321 and to start the wireless transfer of user communications to wireless base station 330 over link 331 (206). Wireless communication interface 301 stops transferring the user communications to wireless base station 320 and starts transferring additional user communications to wireless base station 330 (206).

In the above operation, mobile communication device 300 can use various techniques to identify base station 330. Mobile communication device 300 may receive a base station list from base station 320 that identifies base station 330. Mobile communication device 300 could scan various frequencies to detect a pilot signal from base station 330. Mobile communication device 300 can access a database (internal or external) that translates the current location of device 300 into a base station list that includes base station 330. Other suitable techniques could be used.

In the above operation, mobile communication device 300 can use various techniques to determine the communication priority of base stations 320 and 330. Mobile communication device 300 may obtain a base station list that is arranged in a prioritized order that indicates the relative priority of base stations 320 and 330. Such an arrangement might assign different priorities to different groups of base stations. Mobile communication device 300 may process a base station identifier, where identifier encodes the priority of that base station. Mobile communication device 300 may access a database (internal or external) that translates a base station identifier into a priority level for that base station. Other suitable techniques could be used.

In the above operation, mobile communication device 300 can use various techniques to determine sufficient communication performance for base station 330. Mobile communication device 300 may receive a noise indicator and/or a signal strength indicator for link 331 from base station 330. Mobile communication device 300 may perform signal processing to generate a noise indicator and/or a signal strength indicator for link 331. Mobile communication device 300 would then compare the noise indicator and/or the signal strength indicator to threshold values that represent sufficient communication performance. Mobile communication device 300 may access a database (internal or external) that translates the current location of device 300 into a determination of sufficient communication performance for base station 330. Other suitable techniques could be used.

In the above operation, mobile communication device 300 can use various techniques to initiate the handoff from base station 320 to base station 330. Mobile communication device 300 could transfer a hand-off request to base station 320. Mobile communication device 300 could transfer a hand-off request to base station 330. Mobile communication device 300 could transfer associated hand-off requests to both base stations 320 and 330. Mobile communication device 300 could transfer a hand-off request to some other control system. Typically a hand-off timer is used to delay the hand-off for a short period to ensure that the conditions initiating the hand-off are stable and not merely transitory. Other suitable techniques could be used.

Figure 5:
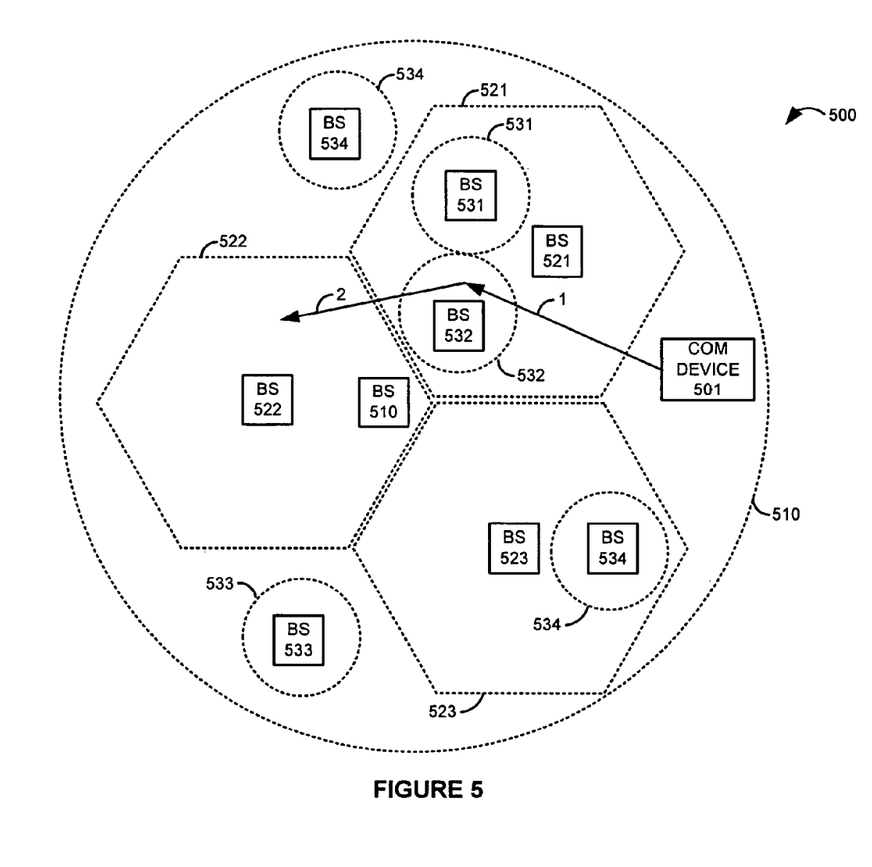
FIG. 5 is a block diagram that illustrates a communication system.

FIG. 5 is a block diagram that illustrates communication system 500. Communication system 500 includes mobile communication device 501 whose movements are indicated by numbered arrows on FIG. 5. Communication system 500 also includes base stations 510, 521-523, and 531-534 that serve respective cells 510, 521-523, and 531-534. The cells are geographic areas with approximate boundaries as indicated by dotted lines on FIG. 5. The cell boundaries indicate the approximate wireless communication range of the associated base station in that cell. Note that some cells are adjacent, such as cells 521 and 522. Note that some cells are entirely contained within other cells, such as cells 534 and 523 or cells 522 and 510.

Figure 6:
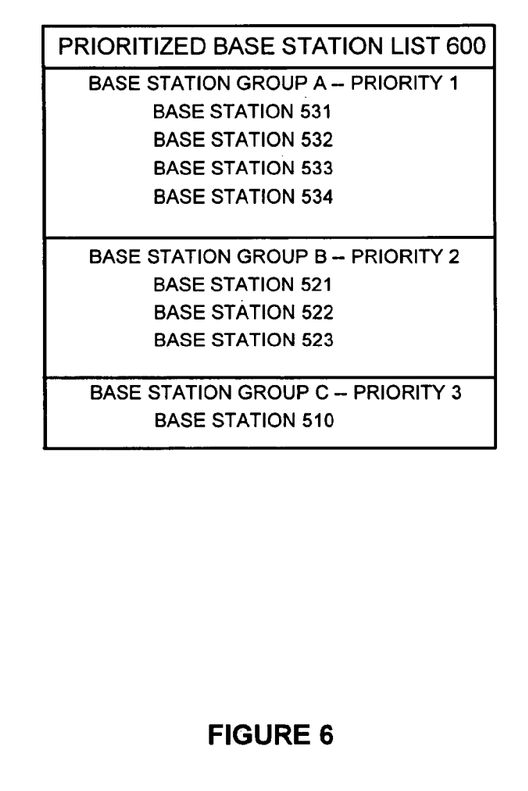
FIG. 6 is a diagram that illustrates a prioritized base station table.

FIG. 6 illustrates prioritized base station list 600. List 600 indicates base station groups A, B, and C. Base station group A has the highest priority #1 and includes base stations 531-534. Base station group B has the middle priority #2 and includes base stations 521-523. Base station group C has the lowest priority #3 and includes base station 510. By comparing the priority groupings to FIG. 5, it can be appreciated that the smallest cells 531-534 have priority over larger cells 510 and 521-523, and mid-sized cells 521-523 have priority over the largest cell 510. In one example, Group A could be small indoor pico-cell base stations, Group B could be tower macro-cell base stations, and Group C could be a boomer metro-cell base station. If desired a lowest priority Group D could be added for a satellite national-cell base station.

Referring to FIGS. 5-6, a first scenario is discussed with respect to movement arrow #1. At the beginning of the first scenario, mobile communication device 501 is located in cell 510 and uses base station 510. Mobile communication device 501 moves to a point in cells 510, 521, and 532. Base station 510 transfers prioritized base station list 600 to mobile communication device 501. In response to receiving list 600, mobile communication device 501 determines if list 600 includes any base stations having a higher priority than the current serving base station 510. In this example, mobile communication device 501 identifies base stations 521-523 and 531-534 that have a higher priority than the current serving base station 510.

In response to identifying higher priority base stations 521-523 and 531-534, mobile communication device 501 scans base stations 510, 521-523, and 531-534 to obtain noise and signal strength indicators each base station. Mobile communication device 501 then compares the noise and signal strength indicators to thresholds to identify the base stations 510, 521-523, and 531-534 that have sufficient communication performance for mobile communication device 501. In this example, base stations 510, 521, and 532 have sufficient communication performance. Mobile communication device 501 then ranks base stations 510, 521, and 532 by their priority. Thus, the ranking is base station 532 first, base station 521 second, and base station 510 third. Mobile communication device 501 selects base station 532 because it has the highest priority among the base stations with sufficient communication performance. Mobile communication device 501 initiates a hand-off from base station 510 to base station 532.

If multiple base stations with sufficient communication performance share the highest priority, then mobile communication device 501 selects one of these base stations based on performance, pre-assignment, randomly, or using some other criteria. For example, assume that base stations 531-532, which have the same priority, both had sufficient communication performance. Mobile communication device 501 may select base station 532 over base station 531 based on signal strength.

A second scenario is discussed with respect to movement arrow #2. At the beginning of the second scenario, mobile communication device 501 uses base station 532 and is located in cells 510, 521, and 532. Mobile communication device 501 moves to a point in cells 510 and 522. During the move, mobile communication device 501 determines that the signal strength of its current serving base station 532 falls below a threshold. In response to the loss of signal strength, mobile communication device 501 scans base stations 510, 521-523, and 531-534 on list 600 to obtain noise and signal strength indicators. Mobile communication device 501 then compares the noise and signal strength indicators to thresholds to identify the base stations 510, 521-523 and 531-534 that have sufficient communication performance for mobile communication device 501. In this example, base stations 510 and 522 have sufficient communication performance. Mobile communication device 501 then ranks base stations 510 and 522 by their priority. Thus, the ranking is base station 522 first and base station 510 second. Mobile communication device 501 selects base station 522 because it has the highest priority among the base stations with sufficient communication performance. Mobile communication device 501 initiates a hand-off from base station 532 to base station 522.

Advantageously, communication system 500 optimizes network performance by directing mobile communication devices to smaller base stations when technically feasible. This optimization frees up capacity in the larger cells that tend to get overloaded more easily. The extra capacity enables the larger cells to better serve geographic areas that are not served by the smaller base stations.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a mobile communication device comprising:
   wirelessly transferring user communications to a first wireless base station;
   identifying a second wireless base station that has sufficient performance characteristics for wireless communication with the mobile communication device and that has a higher communication priority than the first wireless base station, and in response, initiating a hand-off from the first wireless base station to the second wireless base station; and
   in response to the hand-off, stopping the wireless transfer of the user communications to the first wireless base station and wirelessly transferring additional user communications to the second wireless base station,
   wherein identifying the second wireless base station having the higher communication priority comprises wirelessly receiving a prioritized base station list and processing the prioritized base station list to determine that the second wireless base station has the higher communication priority than the first wireless base station based on the priority order set in the prioritized base station list.

2. The method of claim 1 wherein the first wireless base station serves a first geographic area and the second wireless base station serves a second geographic area that is contained within the first geographic area.

3. The method of claim 1 wherein identifying the second wireless base station having the sufficient performance characteristics comprises, in response to determining that that the second wireless base station has the higher communication priority than the first wireless base station, wirelessly receiving a signal from the second wireless base station, obtaining a noise indicator for the second wireless base station based on the received signal, and comparing the noise indicator to a noise threshold.

4. The method of claim 1 wherein identifying the second wireless base station having the sufficient performance characteristics comprises, in response to determining that that the second wireless base station has the higher communication priority than the first wireless base station, wirelessly receiving a signal from the second wireless base station, obtaining a signal strength indicator for the second wireless base station based on the received signal, and comparing the signal strength indicator to a signal strength threshold.

5. The method of claim 1 wherein initiating the hand-off comprises wirelessly transferring a hand-off request to at least one of the first wireless base station and the second wireless base station.

6. The method of claim 1 wherein the user communications and the additional user communications comprise Internet communications.

7. A mobile communication device comprising:
   a wireless communication interface configured to wirelessly transfer user communications to a first wireless base station and to wirelessly transfer additional user communications a second wireless base station;
   a processing system configured to identify the second wireless base station as having sufficient performance characteristics for wireless communication with the mobile communication device and as having a higher communication priority than the first wireless base station, and in response, to initiate a hand-off from the first wireless base station to the second wireless base station;
   the processing system further configured to direct the communication interface to stop the wireless transfer of the user communications to the first wireless base station and to start the wireless transfer of the additional user communications to the second wireless base station in response to the hand-off,
   wherein the wireless communication interface configured to wirelessly receive a prioritized base station list, and the processing system is configured to process the prioritized base station list to determine that the second wireless base station has the higher communication priority than the first wireless base station based on the priority order set in the prioritized base station list.

8. The mobile communication device of claim 7 wherein the first wireless base station serves a first geographic area and the second wireless base station serves a second geographic area that is contained within the first geographic area.

9. The mobile communication device of claim 7 wherein:
   the wireless communication interface is configured to wirelessly receive a signal from the second wireless base station and obtain a noise indicator for the second wireless base station based on the received signal;
   the processing system is configured to direct the wireless communication interface to receive the signal and obtain the noise indicator, and wherein the processing system is configured to compare the noise indicator to a noise threshold.

10. The mobile communication device of claim 7 wherein:
the wireless communication interface is configured to wirelessly receive a signal from the second wireless base station and obtain a signal strength indicator for the second wireless base station based on the received signal;
the processing system is configured to direct the wireless communication interface to receive the signal and obtain the signal strength indicator, and wherein the processing system is configured to compare the signal strength indicator to a signal strength threshold.

11. The mobile communication device of claim 7 wherein initiating the hand-off comprises wirelessly transferring a hand-off request to at least one of the first wireless base station and the second wireless base station.

12. The mobile communication device of claim 7 wherein the user communications and the additional user communications comprise Internet communications.

* * * * *